3,301,768
PROCESS FOR OBTAINING
AMYLOGLUCOSIDASE
Karl L. Smiley, Peoria, Ill., assignor to the United States of America as represented by the Secretary of Agriculture
No Drawing. Filed Oct. 26, 1964, Ser. No. 406,622
1 Claim. (Cl. 195—66)

A nonexclusive, irrevocable royalty-free license in the invention herein described, throughout the world for all purposes of the United States Government, with the power to grant sublicenses for such purposes, is hereby granted to the Government of the United States of America.

This invention relates to a process for obtaining greatly increased yeilds of the commercially available starch-splitting enzyme, amyloglucosidase.

More specifically, this invention relates to the unobvious discovery that aerobic fermentations of the just recently classified microorganism Aspergillus awamori NRRL 3112 in a weakly acidic medium (pH 5.5) comprising about 20 parts by weight of ground corn meal, 1 part of malted barley for enzymatic liquification and reduction of viscosity of the meal dispersion prior to sterilization, and 79 parts of water yields about 3 to 5 times as much amyloglucosidase per ml. of culture filtrate accompanied by very little, if any, of the objectionable transglucosidase that is also produced under the same conditions by Aspergillus niger NRRL 337, which latter organism is conventionally employed in the industrial production of amyloglucosidase that is widely used for converting starch to glucose, notwithstanding the fact that the large amount (about 20–25 percent based on the amyloglucosidase) is concurrently produced transglucosidase (transferase), which latter enzyme forms isomaltose and other oligosaccharides that are not readily hydrolyzed by the amyloglucosidase and that, therefore, interfere with the crystallization of the glucose. Filtered liquors from fermentations of Aspergillus niger NRRL 337 have amyloglucosidase potencies of 3.0 to 3.5 units per ml., the standard unit being the amount of amyloglucosidase necessary for forming 1 g. of glucose from 4 g. of starch in one hour at 60° C.

A principal object of this invention is a process for obtaining amyloglucosidase in greatly improved yields or potencies per ml. of culture filtrate. Another object is a process for preparing nonconcentrated culture filtrates containing at least about 12 and as much as about 18 units per ml. of amyloglucosidase unaccompanied by any significant amount of transglucosidase. Still another object is an especially potent nonconcentrated amyloglucosidase-containing culture filtrate that does not also require removal of transglucosidase for use in the manufacture of crystalline glucose from starch. Other objects and advantages will appear hereinafter.

In accordance with the objects of this invention it has now been discovered that nonevaporated culture filtrates having extraordinarily high amyloglucosidase contents or potencies per ml., i.e., at least about 12 units, said filtrates being essentially free of associated transglucosidase, are obtained by inoclulating a partially hydrolyzed corn medium with a culture of a uniquely active microorganism, namely Aspergillus awamori NRRL 3112, and incubating under highly aerobic conditions (about 1.5 vol. of air per min. per vol. of medium with constant agitation) for about 4 days at 35° C.

It was found that a 15 percent by weight concentration of ground corn meal provided significantly lower yields of amyloglucosidase per ml. of final filtrate and also that the yields were not further improved by employing a 25 percent concentration of corn meal. Thus, a 20 percent concentration of meal is greatly preferred. To overcome the aeration difficulties attending the extremely high viscosities produced by the large amount of meal, about 5 percent of gibberellin-activated barley malt, based on the weight of corn meal, and sufficient mineral acid, e.g., HCl or $H_2SO_4$ to adjust the pH to 5.5 are added to the unsterilized medium prior to inoculation. The medium is then held at 60° C. for 20 minutes to allow the malt enzymes to at least partially hydrolyze and liquify the starch present in the meal, and then is steam sterilized at 120° C., thereby inactivating the malt enzymes. The cooled, fluid culture medium is then inoculated with a cell suspension of Aspergillus awamori NRRL 3112 and subjected to incubation with constant aeration and agitation.

The following detailed example is set forth to particularly illustrate the improved process of my invention.

Example

A baffled 20-liter fermentor with air admission and impeller agitation means was charged with 2,000 g. of ground whole corn and 7,900 ml. of tap water at 60° C., and the pH then adjusted to a value of 5.5 with HCl. Then 100 g. of commercial barley malt was added, and the contents were held at 60° C. for 20 minutes with continuous stirring to thin the medium. Following autoclaving at 120° C. the cooled sterile medium was inoculated with an aqueous suspension of Aspergillus awamori NRRL 3112, and incubated at 35° C. for 4 days while admitting about 15,000 ml. of moisturized sterile air per minute while providing agitation with stirrers whose peripheries moved at the rate of about 700 linear ft./min. Assays of the obtained filtrate showed a potency of 12 amyloglucosidase units per ml. as compared with a potency of 3.5 units per ml. from a standard fermentation with Aspergillus niger NRRL 337.

Chromatography of the Aspergillus awamori filtrate on DEAE cellulose showed no peak corresponding to transglucosidase, but did show two subsequently verified major peaks of amyloglucosidase and one extremely minor peak of unknown nature that showed a trace of amylolytic activity. On elution there was obtained a first amyloglucosidase fraction analyzing 50 mg. of protein, a second amyloglucosidase fraction analyzing 32.4 mg. of protein, and, eluting much later, a third fraction representing the minor peak and containing only 0.518 mg. of protein. The first and second fractions were found to produce essentially quantitative (i.e., 98%) conversions of starch to glucose in 24 hours, thus proving the absence of transglucosidase. The negligible third fraction appeared to exert a slight but inconclusive amylolytic action.

By contrast, a similar chromatographic treatment of the filtrate from a fermentation of Aspergillus niger NRRL 337 yielded Fraction I (amyloglucosidase) 23.9 mg. protein, Fraction II (transglucosidase) 8.4 mg. protein, and Fraction III (amyloglucosidase) 9.7 mg. protein. Thus, the 33.6 mg. of amyloglucosidase was accompanied by 8.4 mg. of transglucosidase, which represents 25 percent by weight of interfering enzyme based on the weight of the amyloglucosidase.

Having fully disclosed my invention, I claim:

An improved microbiological process for obtaining high yields of amyloglucosidase substantially free of concommitantly produced transglucosidase comprising (a) Heating an acidified dispersion comprising about 20 parts by weight of ground corn meal, 79 parts of water and 1 part of barley malt at 60° C. for about 20 minutes to partially hydrolyze the corn starch and lower the viscosity;

(b) Steam sterilizing the partially hydrolyzed dispersion to inactivate the malt enzymes and provide a sterile culture medium;

(c) Inoculating the cooled medium with an aqueous suspension of *Aspergillus awamori* NRRL 3112;

(d) Incubating the inoculated medium at 35° C. for about 4 days while strongly agitating the medium and admitting moist sterile air at a rate of about 1.5 v./v./min.;

(e) Removing the cells to provide a nonevaporated cell-free liquid containing per ml. at least about 12 units of amyloglucosidase, said cell-free liquid being further characterized by being essentially free of transglucosidase.

References Cited by the Examiner
UNITED STATES PATENTS

| | | | |
|---|---|---|---|
| 3,012,944 | 12/1961 | Armbruster | 195—31 |
| 3,249,514 | 5/1966 | Bode | 195—66 |

A. LOUIS MONACELL, *Primary Examiner.*

L. M. SHAPIRO, *Assistant Examiner.*